Aug. 13, 1963  A. A. ASHTON  3,100,555
PLASTIC TOWER
Filed Oct. 16, 1961  2 Sheets-Sheet 1
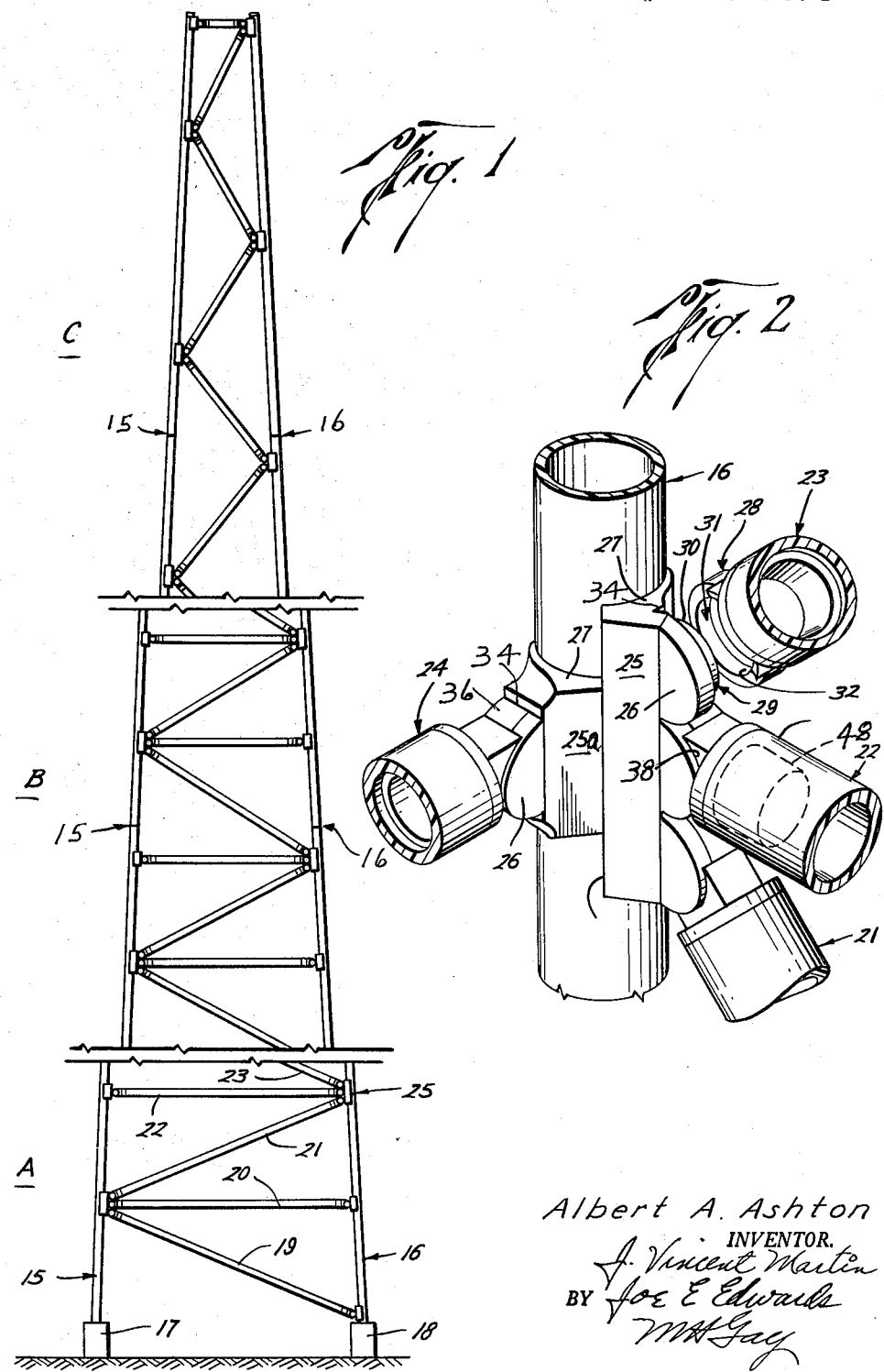
Albert A. Ashton
INVENTOR.
BY J. Vincent Martin
Joe E. Edwards
M. H. Gay
ATTORNEYS

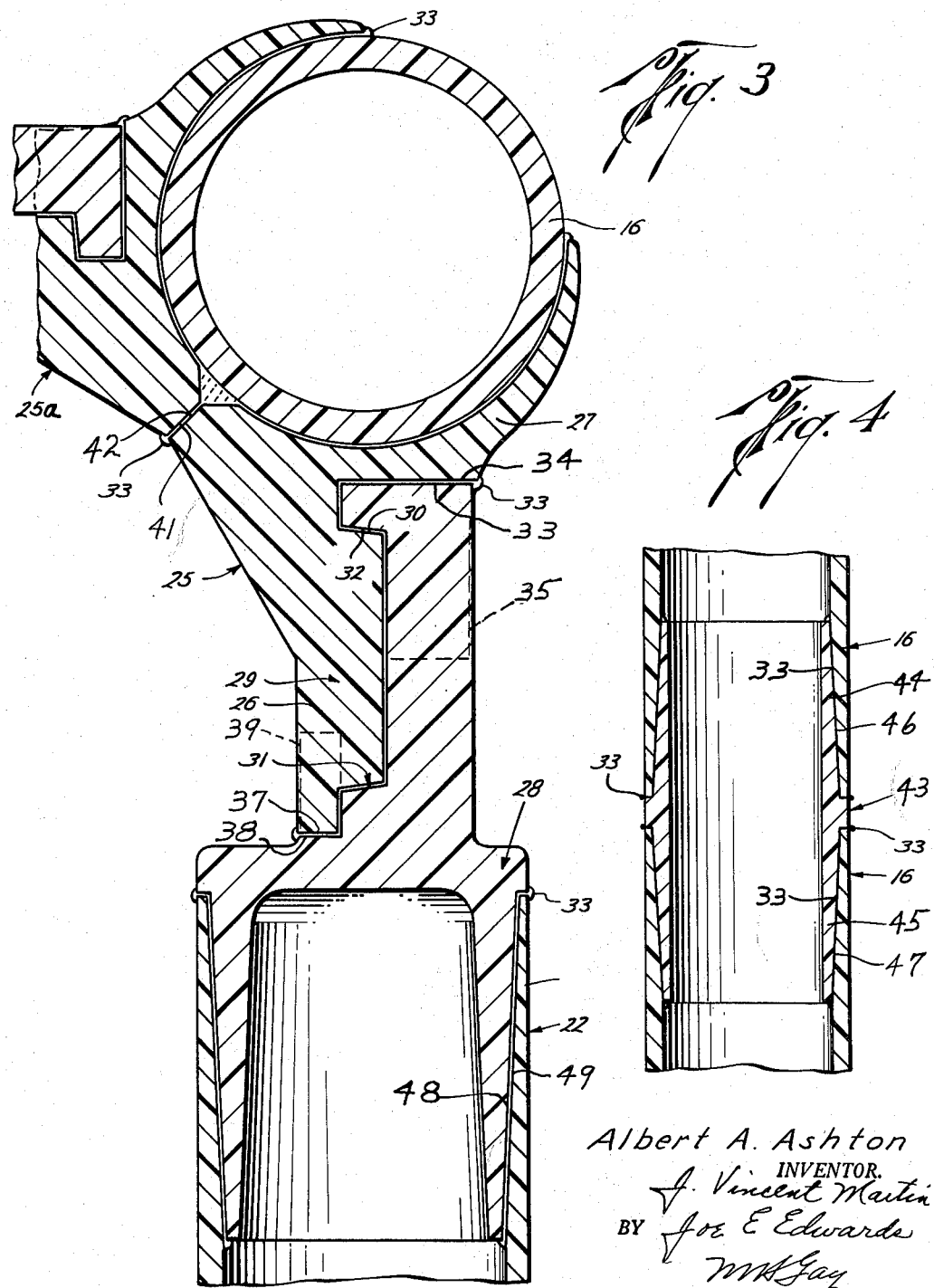

United States Patent Office 3,100,555
Patented Aug. 13, 1963

3,100,555
PLASTIC TOWER
Albert A. Ashton, Dallas, Tex., assignor to The Youngstown Sheet and Tube Company, Youngstown, Ohio, a corporation of Ohio
Filed Oct. 16, 1961, Ser. No. 145,337
7 Claims. (Cl. 189—19)

This invention relates to a tower having converging legs composed of plastic tubular members and more particularly to the manner in which the components of the tower are assembled.

There is a need for towers of a derrick-like structure fabricated in their entirety from non-metallic plastic structural members. Such towers are especially useful in supporting electromagnetic wave antenna systems such as utilized in radio and radar services and like uses. Such plastic towers are most desirable because they do not create reflections, ghosts and other types of electrical interference so commonly a problem in metal towers.

The known joints using members such as the T and K type connections, which generally resemble pipe fittings, can be used for assembling plastic towers. However, these fittings limit the attachment of the bracing members to certain locations on the leg members of the tower and the angular disposition of the bracing and leg members to the fixed angle provided by the T or K type connection. Because of this, the bracing members can not be attached to converging leg members at random locations thereon and angularly disposed to interconnect the leg members at the optimum angles thereto for maximum tower strength without having a large variety of such fittings with slightly different angular configurations.

This invention is directed toward providing a tower having legs converging at any desired angle constructed in its entirety of plastic tubular structural members with novel plastic joints for assembling such members into rigid interconnection. This plastic joint allows the bracing members to be mounted on the leg members at any location thereon, rotated into any desired angular disposition relatively to the leg members for maximum tower strength and then rigidly secured in such disposition by means of an adhesive interposed between their meeting surfaces. A modification of such joint allows random lengths of the plastic tubular members to be rigidly interconnected into coaxial alignment to provide any desired length of such member.

It is therefore an object of the present invention to provide a plastic tower constructed of converging tubular leg members and tubular bracing members rigidly interconnected by novel plastic joints.

Another object is to provide a plastic tower that is free from interference to electromagnetic waves and is easily assembled from a few standard components.

Another object is to provide a plastic tower in accordance with the preceding objects that is light in weight and so that it can be readily transported and assembled in remote areas.

A further object is to provide a novel plastic joint for mounting plastic tubular bracing members at any location onto converging plastic tubular leg members with any desired angular relationship with the leg members.

Another object is to provide a plastic joint that has a structure that can be assembled, angularly adjusted and withstand moderate axial loads until the adhesive used to integrally interconnect the coacting members of such joint can harden without the use of auxiliary clamps, bolts or the like.

Yet another object is to provide a compact inexpensive plastic joint that allows random lengths of tubular structural members to be brought into coaxial alignment and then secured into a rigid connection with adhesive.

Another further object is to provide a plastic joint wherein assembly thereof will not wipe the adhesive used to secure the members of the joint together from between their meeting surfaces, and the axial forces applied to the joint create only a minor lateral force to separate the joint before the adhesive hardens.

These and other objects will become more apparent when read in conjunction with the following detailed description and the attached drawings wherein the same parts will be designated by like numerals in the various views:

FIGURE 1 is an elevation of an all plastic tower constructed with converging tubular leg members and tubular bracing members rigidly interconnected by novel plastic joints arranged in accordance with the present invention;

FIGURE 2 is a perspective view from the center of the tower of FIGURE 1 illustrating one of the plastic joints interconnecting the leg members to several bracing members with one such bracing member in a disassembled position;

FIGURE 3 is a partial horizontal sectional view medially through the structure shown in FIGURE 2; and, FIGURE 4 is a vertical section taken through one of the novel plastic joints of the tower in FIGURE 1 used to rigidly interconnect adjacent lengths of the tubular leg members of the tower into integral coaxial alignment.

In FIGURE 1 there is shown a plastic tower constructed in its entirety from plastic tubular members assembled into rigid interconnection by the novel plastic joints of this invention. The plastic tubular members are of conventional design and may be plastic pipe of the type having a woven body of fiberglass impregnated with an epoxy resin. This construction provides a pipe that is light in weight but yet strong. Such pipe is presently available commercially from Fibercast Company of Tulsa, Oklahoma. Other types of plastic tubular members can be used if desired.

The tower has at least two converging leg members 15 and 16 secured in an upright position on pedestals 17 and 18 positioned in the earth. Other leg members can be used and preferably the tower has three or four leg members so that it is self-supporting.

The leg members 15 and 16 are rigidly interconnected by bracing members 19, 20, 21, 22 and 23 shown in the lower section A of FIGURE 1, and similar unnumbered bracing members are used for the middle portion B and upper portion C of such tower. The novel joints of the present invention are used to provide the rigid interconnection of the tubular bracing and leg members of the tower. It is noted that the bracing members form different angles with the leg members at different elevations on the tower.

In general, the joint comprises a plastic leg connector member or body integrally carried by the leg member and provided with a portion preferably extending radially therefrom. A plastic end fitting is secured to the end of the bracing member. The fitting and the extending portion of the leg connector have coacting projections and depressions with preferably straight sidewall surfaces thereon to pivotally mount the fitting onto the connector. An adhesive is interposed between the mating surfaces of the projections and depressions for integrally connecting the connector and end fitting when the adhesive hardens whereby a rigid joint therebetween is obtained. Thus, the rigidity in the joint is achieved by the combination of the projections and depressions with an adhesive therebetween.

More specifically, a joint is shown in detail in FIGURE 2 wherein a plurality of bracing members 21, 22, 23 and 24 are secured to leg member 16. The bracing member 24 extends at right angles from leg member 16 in a horizontal plane relative to the other bracing members to another leg member when more than two converging leg members are used. The joint between bracing member 23 and leg member 16 will be described in detail but such description applies equally to the remaining interconnections of the bracing and leg members. It is to be noted that the joint may interconnect one or more bracing members to a leg member. Of course, the bracing members include both girth and diagonal braces.

The joint comprises a plastic leg connector 25 having a circular portion 27 to receive leg member 16 and secured thereto by a fastening means, such as an adhesive. This circular portion 27 allows the leg connector 25 to be mounted at any desired location on the leg member 16 and on an individual basis without regard to other joints. Thus, the problems of known joints, which require their end portions at given locations on the leg members, is avoided.

The leg connector 25 has a section 26 preferably extending radially from the leg member 16 that is substantially flat in cross-section. On the portion 26 is formed a projection. The projection preferably has a straight side wall and is preferably in the form of a frusto-conical plastic pin 29.

The bracing member 23 is provided with a plastic end fitting 28 that is secured thereto. Fitting 28 is provided with a depression or socket 31 of a configuration so as to coact with the pin on the leg connector 25 to pivotally mount the bracing member 23 to body 25. The socket 31 has a straight sidewall bounding surface 32 complementary to surface 30 of pin 29 so that when the joint is assembled these surfaces interfit. Of course, this arrangement may be interchanged so that the depression and projection may be placed on the body 25 and fitting 28, respectively.

The joint is assembled by integrally connecting the circular portion 27 of body 25 to leg member 16 at a desired location by a fastening means such as adhesive 33. The adhesive 33 may be of any desired conventional type that can integrally seal the plastic tubular members together and is preferably of the epoxy type. Adhesive 33 is also applied to the sidewall surface 30 of pin 29 and the socket 31 of fitting 28 is pivotally mounted over the pin 29. The bracing member 23 is rotated about its pivotal mounting on pin 29 to the desired angular disposition relative to leg member 16 and maintained in such adjustment until the adhesive hardens to rigidly interconnect the bracing and leg members. Thus, the bracing members can be mounted at any desired location on the leg members and integrally connected thereto at the desired angular relationship for maximum tower strength. A single joint can be used for all bracing members regardless of the angle between the leg members. It will be noted that the central axes of the pins and sockets are coaxial and perpendicular to the longitudinal axis of the brace to which the end fitting is attached. This permits the brace to be rotated to the desired angle and at this angle be connected to adajcent legs of the tower.

The sidewall surfaces 30 and 32 of the projection and depression preferably are tapered rather than cylindrical in order that when the joint is assembled adhesive 33 used to rigidly interconnect the body 25 and plastic fitting 28 will not be wiped from the joint.

This taper may be of any angular convergence relative to the central axis of the projection and depression, but it has been found that an angle of approximately 5 degrees provides superior results. Such taper limits to a small degree the lateral forces produced by axial loading of the braces, but yet prevents adhesive 33 from being wiped from the joint as it is assembled. A taper of this magnitude allows the fitting 28 to be easily pivotally mounted over the pin 29. The bracing member 23 can be rotated to the desired angular disposition relative to the leg member 16 and hold such disposition against axial loads tending to separate the joint until the adhesive therebetween can harden. This is an important advantage of the present invention that permits each joint to be assembled on an individual basis and allows the joint to be assembled, adjusted and held in the desired angular adjustment of the bracing member and leg member until the adhesive 33 can harden without clamps, bolts or the like.

In order to provide additional adhesive area, complementary surfaces in addition to those previously described are provided on the end fittings and leg connectors. Each leg connector is preferably provided with a curved surface 34. This surface curves about an axis coaxial with the axis of the pin and socket. As shown by the dotted lines 35 of FIGURE 3, the surface 34 extends about approximately a semi-circle in the case of the central or horizontally extending brace 22. With reference to FIGURE 2, it will be noted that the surface 34 in the case of the upper brace 23 terminates short of the center line of the pin and socket to permit the diagonal 23 to be angled upwardly. The same construction would prevail in conjunction with the bottom diagonal 21.

The end fittings 28 are provided with surfaces 36 which are complementary to surfaces 34 and interfit therewith when the pin and socket are made up. This construction provides a tremendous additional glue area as well as additional structural support against longitudinal loading of the braces in compression.

Referring to FIGURE 3, it will be noted that still additional complementary surfaces are provided at 37 on the leg connector and 38 on the end fitting. The dotted line representation at 39 of FIGURE 3 shows the angular extent of these complementary surfaces to be substantially less than a semi-circle so that they will not interfere with angular positioning of the braces.

The leg connector thus far described has employed three integral sections to provide for connecting three braces thereto. As will be apparent from FIGURE 2, the leg connector may have any desired number of sections on which pins or sockets, as the case may be, are provided. In a tower constructed in the manner illustrated in FIGURE 1, it is preferred that the braces extending from one leg to the legs on opposite sides of said one leg be connected to said one leg at a common elevation as shown in FIGURE 2. For this purpose, a single type leg connector 25a is secured to the leg 16 at the same elevation as connector 25. The construction of this connector is identical with that of the previously described connector except that it can accommodate only one brace. Of course, it is turned over relative to connector 25 so that the pin of leg connector 25a extends away from the pin of leg connector 25.

It will be noted that the two leg connectors 25 and 25a embrace leg 16 about substantially more than a semi-circle. It will also be noted that leg connector 25 has a surface 41 which abuts a complementary surface 42 on leg connector 25a. These surfaces are also glued to each other by adhesive 33 so that the two leg connectors form, in effect, a single integral connector which extends more than half way around the leg 16. This construction gives additional strength to the joint and, after one leg connector 25 has been placed on leg 16, provides for orientation of the second leg connector.

Random lengths of tubular leg members 16 may be connected together without threaded connections, if desired, as shown in FIGURE 4. A mandrel 43 having oppositely extending frusto-conical portions 44 and 45 interfits between two leg sections having frusto-conical ends 46 and 47. Adhesive 33 is applied in the frusto-conical joint surfaces to integrally glue the mandrel and leg sections together. The frusto-conical surfaces preferably have a taper of about 5° so that glue will not be wiped from the joint as the leg sections are moved into position over the mandrel.

The end fittings 28 may be connected to the braces in similar manner. As best shown in FIGURE 3, the end fittings 28 have frusto-conical outer surfaces 48 adapted to mate with a frusto-conical inner surface 49 of the end fitting. These frusto-conical surfaces also preferably have a taper of about 5° and the end fitting and bracing are firmly secured together by adhesive 33.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A plastic tower comprising, a plurality of upwardly converging plastic legs, a plurality of plastic leg connectors glued to said legs at spaced points therealong, each leg connector having at least one section projecting substantially transversely of the leg to which it is attached, a plurality of plastic braces extending between said leg connectors, plastic end fittings on said braces, said leg connector sections and end fittings having mating parts provided by a pin on one of said leg connector sections and end fittings and a socket on the other of said leg connector sections and end fittings, the central axis of each pair of said mating pin and socket extending perpendicular to the longitudinal axis of the brace on which the end fitting is carried, and an adhesive between said pins and sockets integrally connecting them together.

2. A plastic tower comprising, a plurality of upwardly converging plastic legs, a plurality of plastic leg connectors glued to said legs at spaced points therealong, each leg connector having at least one section projecting substantially transversely of the leg to which it is attached, a plurality of plastic braces extending between said leg connectors, plastic end fittings on said braces, said leg connector sections and end fittings having mating parts provided by a pin on one of said leg connector sections and end fittings and a socket on the other of said leg connector sections and end fittings, the central axis of each pair of said mating pin and socket extending perpendicular to the longitudinal axis of the brace on which the end fitting is carried, the sidewalls of said socket and pin progressively decreasing in diameter along their respective axes toward the free end of said pin, and an adhesive between said pins and sockets integrally connecting them together.

3. A plastic tower comprising, a plurality of upwardly converging plastic legs, a plurality of plastic leg connectors glued to said legs at spaced points therealong, each leg connector having at least one section projecting substantially transversely of the leg to which it is attached, a plurality of plastic braces extending between said leg connectors, plastic end fittings on said braces, said leg connector sections and end fittings having mating parts provided by a pin on one of said leg connector sections and end fittings and a socket on the other of said leg connector sections and end fittings, the central axis of each pair of said mating pin and socket extending perpendicular to the longitudinal axis of the brace on which the end fitting is carried, the sidewalls of said socket and pin forming a frustum of a cone decreasing in diameter along their respective axes toward the free end of said pin, and an adhesive between said pins and sockets integrally connecting them together.

4. The tower of claim 3 wherein the sidewalls of said socket and pin have a slope of about 5°.

5. The tower of claim 1 wherein two leg connectors are glued to a leg at the same elevation and to each other, and wherein said two leg connectors extend about and are glued to the pipe over more than half of a circle.

6. A plastic tower comprising, a plurality of upwardly converging plastic legs, a plurality of plastic leg connectors glued to said legs at spaced points therealong, each leg connector having at least one section projecting substantially transversely of the leg to which it is attached, a plurality of plastic braces extending between said leg connectors, plastic end fittings on said braces, said leg connector sections and end fittings having mating parts provided by a pin on one of said leg connector sections and end fittings and a socket on the other of said leg connector sections and end fittings, the central axis of each pair of said mating pin and socket extending perpendicular to the longitudinal axis of the brace on which the end fitting is carried, said leg connectors and end fittings additionally having complementary surfaces which confront each other when the pin and socket are made up, said complementary surfaces curved about an axis coaxial with the axis of the pin and socket, and an adhesive between said pins and sockets and said complementary surfaces integrally connecting the end fittings to the leg connectors.

7. A plastic tower comprising, a plurality of upwardly converging plastic legs, a plurality of plastic leg connectors glued to said legs at spaced points therealong, each leg connector having at least one section projecting substantially transversely of the leg to which it is attached, a plurality of plastic braces extending between said leg connectors, plastic end fittings on said braces, said leg connector sections and end fittings having mating parts provided by a pin on one of said leg connector sections and end fittings and a socket on the other of said leg connector sections and end fittings, the central axis of each pair of said mating pin and socket extending perpendicular to the longitudinal axis of the brace on which the end fitting is carried, the sidewalls of said socket and pin progressively decreasing in diameter along their respective axes toward the free end of said pin, said leg connectors and end fittings additionally having complementary surfaces which confront each other when the pin and socket are made up, said complementary surfaces curved about an axis coaxial with the axis of the pin and socket, and an adhesive between said pins and sockets and said complementary surfaces integrally connecting the end fittings to the leg connectors.

References Cited in the file of this patent

UNITED STATES PATENTS

| | | |
|---|---|---|
| 1,221,747 | Kightlinger | Apr. 3, 1917 |
| 1,880,231 | Bearly | Oct. 4, 1932 |
| 2,037,980 | Heartz | Apr. 21, 1936 |
| 2,208,276 | McCann | July 16, 1940 |

FOREIGN PATENTS

| | | |
|---|---|---|
| 175,483 | Switzerland | Feb. 28, 1935 |
| 574,708 | Italy | Mar. 26, 1958 |
| 865,472 | Great Britain | Apr. 19, 1961 |